June 24, 1930.    H. C. ANDERSON    1,767,502
PUNCTUREPROOF PNEUMATIC TIRE
Filed April 13, 1928
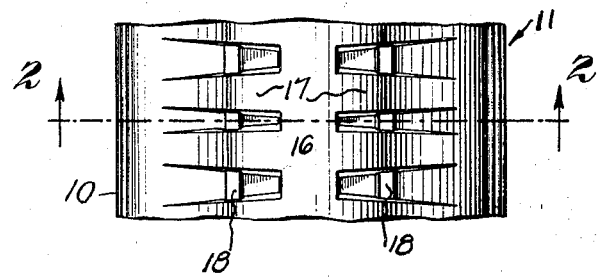
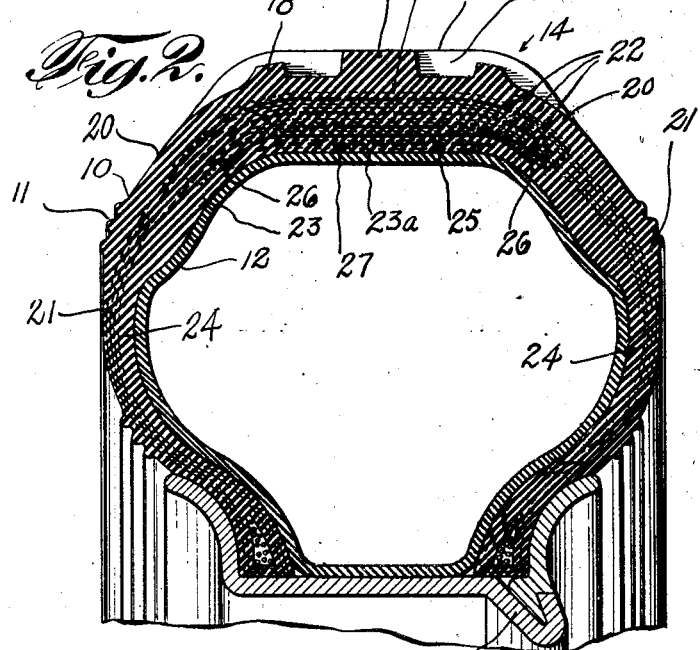
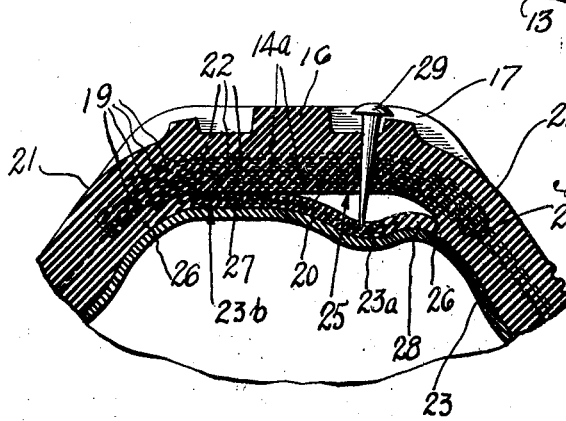
INVENTOR
Hiram C. Anderson
BY Beeler & Schumacher
HIS ATTORNEYS Patented June 24, 1930

1,767,502

UNITED STATES PATENT OFFICE

HIRAM C. ANDERSON, OF NEW YORK, N. Y.

PUNCTUREPROOF PNEUMATIC TIRE

Application filed April 13, 1928. Serial No. 269,630.

This invention relates to pneumatic tires.

One object of this invention is to provide a device of the character described having an improved hard tread or rolling surface which is well adapted to suit the condition of any road without straining the tire.

Another object of this invention is to provide a device of the nature set forth which includes an improved lining to protect the pneumatic tube from being punctured.

A further object of the invention is the provision of a device of the type mentioned wherein an improved inner lining not only prevents damage to the pneumatic tube, but also eliminates creeping therof.

Still another object of this invention is to furnish a tire of the species alluded to which is so re-enforced at the sides thereof as to prevent separation of the rubber and the cords.

A still further object of the invention is the production of a device of the nature specified, in which hard rubber is used as re-enforcement in improved association with the cords, or breaker strips, and the like.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawings:

Figure 1 is a fragmentary view of a tread of my improved tire.
Fig. 2 is a cross sectional view of a tire embodying the invention.

Fig. 3 is a similar fragmentary view showing the puncture proof characteristic of the invention.
Generally described, the invention provides a tire having a heavy, hard rubber tread. The same is re-enforced by a plurality of cords and breaker strips. In course of manufacture of the tire, these cords and breaker strips are imbedded in hard rubber, before being applied to form a part of the tire casing. The outer surface of the tire is substantially flat, to conform to the road, and is ribbed for a strong gripping action. This, together with the stiffness of the tread insures a hard rolling surface so that stones and the like will not become imbedded in the tire.

At the inner surface of the tread portion of the casing, a re-enforced liner guards the pneumatic tube against being punctured by any object that may penetrate the casing. This liner prevents relative creeping movement between the tire and the pneumatic tube.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same comprises a tire 11 for encasing a pneumatic tube 12, these being mounted on a rim structure 13 of any suitable wheel.

The tire 11 includes a tread portion 14 having a substantially flat surface 15. A peripheral rib 16 extends around this surface, which rib is crossed by a plurality of transverse ribs 17. Between the ribs 17, and extending circumferentially of the tire are a series of bracing ribs 18, which are of a lesser height than the foregoing ribs. By this tread surface, the tire conforms to the road, so that it is not subjected to excessive strains. At the same time an effective gripping of the ground is ensured.

The tread includes a re-enforcement, which may consist of a plurality of cords 19, that extend all through the tire. At the tread 14, and immediately adjacent thereto at the portions 20 of the side of the tire 21, these cords are suitably spaced to properly strengthen the heavy body of rubber there provided. Additional stiffness at the tread and portions 20 is obtained through the use of breaker strips 22. These consist of a heavy fabric material impregnated with hard rubber. The hard rubber, on being vulcanized as hereinafter set forth, forms a solid annular mass $14^a$, which possesses great strength.

An inner liner 23 is arranged within the tire and is vulcanized to the sides thereof at 24. Adjacent to the tread and the portions 20, however, the peripheral portion $23^a$ of the liner is separable from the tire. The surface of separation 25 is limited by the circumferential lines at 26. The liner is thus prevented from creeping or moving circumferentially.

Embedded in the liner is a breaker strip 27. This extends into spaced relation to the lines 26, providing therebetween the flexible yielding portions 28. The breaker strip 27 is embedded in hard rubber $23^b$, which does not, however, extend to the edges of the said breaker strip. The portions 28 permit the liner to move inward readily under actuation of a nail 29, and this, in conjunction with the breaker strip 27 prevents the nail from piercing through.

In manufacturing this tire, a thin layer of rubber is first applied to a core, after which the breaker strip 27, which has been properly impregnated with hard rubber, is placed over the said layer. Then additional rubber is applied. Thereafter, collodium or soapstone is placed on the peripheral surface of the liner 23 between lines 26, and rubber applied thereover. The breaker strips 22 and cords 19, which have been previously embedded in hard rubber, are then placed in position, and the final outer layer of rubber applied. The tire is next vulcanized, to form the same into one integral construction, but the portion $23^a$ of the liner 23 remains separable from the tread portion of the tire casing.

It is thus seen that I have provided a device that fulfills the several objects of the invention and is well adapted to meet the conditions of practical use.

I claim:

1. A device of the character described, including a tire casing, an inner pneumatic tube, and a liner between the tube and the casing, said liner being secured to the casing at the sides thereof and being separate from the casing adjacent to the tread portion, said liner having an elastic portion and being sufficiently pliable to avoid immediate penetration by a foreign object, the elastic portion permitting a yielding action to cause the foreign object to assume a deflected position to make the said object ineffective for penetration, the connection between the casing and the liner nevertheless avoiding excessive creeping action of the liner.

2. A device of the character described, including a tire casing, an inner pneumatic tube, and a liner between the tube and the casing; said liner being secured to the casing at the sides thereof and being separate from the casing adjacent to the tread portion, said liner including a body portion to protect the pneumatic tube, said liner and casing having annular elastic connecting portions to secure the same together at the sides, said annular portions being of a width to permit inward yielding movement of the liner under pressure of a foreign object.

In testimony whereof I affix my signature.

HIRAM C. ANDERSON.